United States Patent
Watanabe

(10) Patent No.: US 11,268,929 B2
(45) Date of Patent: Mar. 8, 2022

(54) SENSOR ELEMENT AND GAS SENSOR

(71) Applicant: NGK INSULATORS, LTD., Aichi (JP)

(72) Inventor: Yusuke Watanabe, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 148 days.

(21) Appl. No.: 15/938,233

(22) Filed: Mar. 28, 2018

(65) Prior Publication Data

US 2018/0284056 A1 Oct. 4, 2018

(30) Foreign Application Priority Data

Mar. 30, 2017 (JP) .............................. JP2017-067779

(51) Int. Cl.
*G01N 27/41* (2006.01)
*G01N 27/406* (2006.01)
*G01N 27/407* (2006.01)

(52) U.S. Cl.
CPC ......... *G01N 27/41* (2013.01); *G01N 27/4067* (2013.01); *G01N 27/4072* (2013.01); *G01N 27/4074* (2013.01)

(58) Field of Classification Search
CPC .. G01N 27/41; G01N 27/301; G01N 27/4067; G01N 27/4072; G01N 27/4074; G01N 27/406; G01N 27/4062; G01N 27/4065; G01N 27/407–4078
See application file for complete search history.

(56) References Cited

U.S. PATENT DOCUMENTS

| | | | | | |
|---|---|---|---|---|---|
| 4,655,901 | A | * | 4/1987 | Mase | ................. G01N 27/4071 204/425 |
| 4,882,033 | A | * | 11/1989 | Shibata | ............. G01N 27/4065 204/425 |
| 5,496,461 | A | * | 3/1996 | Hotzel | ............... G01N 27/4071 204/408 |

(Continued)

FOREIGN PATENT DOCUMENTS

| JP | 2004-226171 A | 8/2004 |
|---|---|---|
| JP | 2005-525552 A | 8/2005 |

(Continued)

OTHER PUBLICATIONS

Japanese Office Action received in corresponding Japanese Application No. 2017-067779 dated Aug. 25, 2020.

*Primary Examiner* — Maris R Kessel
*Assistant Examiner* — Vivian A Tran
(74) *Attorney, Agent, or Firm* — Mattingly & Malur, PC

(57) ABSTRACT

A sensor element includes a porous reference gas introduction layer for introducing a reference gas as a reference for detecting a specific gas concentration of a measurement-object gas from an entrance and allowing the reference gas to flow to a reference electrode disposed at the back, wherein the reference gas introduction layer is divided by a partition position defined to be in the range of 50 to 95% of the full length of the reference gas introduction layer from the entrance toward the inside, into a back side portion and an entrance side portion, the reference electrode is accommodated in the back side portion, and the diffusion resistance Rb of the entrance side portion is higher than the diffusion resistance Ra of the back side portion.

5 Claims, 8 Drawing Sheets

(56) References Cited

U.S. PATENT DOCUMENTS

| | | | |
|---|---|---|---|
| 6,660,144 B2 * | 12/2003 | Diehl | G01N 27/4071 |
| | | | 204/426 |
| 2001/0047939 A1 * | 12/2001 | Springhorn | G01N 27/4071 |
| | | | 204/431 |
| 2004/0069630 A1 * | 4/2004 | Tanaka | G01N 27/419 |
| | | | 204/424 |
| 2005/0199497 A1 | 9/2005 | Diehl | |
| 2010/0163411 A1 * | 7/2010 | Su | G01N 27/4077 |
| | | | 204/408 |
| 2012/0247957 A1 * | 10/2012 | Murakami | G01N 27/4067 |
| | | | 204/408 |
| 2013/0092559 A1 * | 4/2013 | Kruse | G01N 27/4072 |
| | | | 205/784.5 |
| 2014/0102170 A1 | 4/2014 | Kato | |
| 2015/0268188 A1 * | 9/2015 | Murakami | G01N 27/4071 |
| | | | 204/431 |
| 2015/0276657 A1 * | 10/2015 | Sekiya | G01N 27/4072 |
| | | | 204/424 |
| 2015/0276659 A1 * | 10/2015 | Sekiya | G01N 27/417 |
| | | | 204/416 |
| 2015/0355142 A1 * | 12/2015 | Murakami | G01N 27/4071 |
| | | | 324/464 |
| 2018/0284052 A1 * | 10/2018 | Watanabe | G01N 27/4071 |
| 2018/0284053 A1 * | 10/2018 | Watanabe | G01N 27/4071 |
| 2018/0284057 A1 * | 10/2018 | Watanabe | G01N 27/4071 |
| 2018/0284058 A1 * | 10/2018 | Watanabe | G01N 27/419 |

FOREIGN PATENT DOCUMENTS

| | | |
|---|---|---|
| JP | 2015-200643 A | 11/2015 |
| WO | 2013/005491 A1 | 1/2013 |

* cited by examiner

SENSOR ELEMENT AND GAS SENSOR

BACKGROUND OF THE INVENTION

1. Field of the Invention

The present invention relates to a sensor element and a gas sensor.

2. Description of the Related Art

Conventionally, a gas sensor that detects the concentration of a specific gas such as NOx in a measurement-object gas such as an exhaust gas of an automobile is known. For example, Patent Literature 1 discloses a gas sensor including a laminate in which a plurality of oxygen ion conductive solid electrolyte layers are laminated, a reference electrode formed in the laminate and into which a reference gas (for example, atmosphere) is introduced from a reference gas introduction space, a measurement electrode disposed in a measurement-object gas flowing portion in the laminate, and a measurement-object gas side electrode disposed in a portion of the laminate that is exposed to the measurement-object gas. This gas sensor detects the specific gas concentration in the measurement-object gas based on the electromotive force generated between the reference electrode and the measurement electrode. This gas sensor is provided with a reference gas regulating device that flows a control current between the reference electrode and the measurement-object gas side electrode and pumps oxygen to around the reference electrode. In Patent Literature 1, there is described that since this reference gas regulating device pumps oxygen to around the reference electrode, a decrease in oxygen concentration can be compensated for when the oxygen concentration of the reference gas around the reference electrode temporarily decreases, and the deterioration in detection accuracy of the specific gas concentration is suppressed. The case where the oxygen concentration of the reference gas around the reference electrode decreases is, for example, a case where the measurement-object gas slightly enters the reference gas introduction space.

CITATION LIST

Patent Literature

PTL 1: JP 2015-200643 A

SUMMARY OF THE INVENTION

However, in the case where oxygen is pumped to around the reference electrode as in Patent Literature 1, the pumped oxygen may sometimes escape to the outside without staying around the reference electrode. For this reason, it is difficult to keep constant the oxygen concentration around the reference electrode, and the detection accuracy of the specific gas concentration in the sensor element may decrease.

The present invention has been made to solve such a problem, and its main object is to suppress the deterioration in detection accuracy of the specific gas concentration.

The present invention adopts the following measures in order to achieve the above-mentioned main object.

The gas sensor element of the present invention includes a laminate having a plurality of laminated oxygen ion conductive solid electrolyte layers and having therein a measurement-object gas flowing portion for introducing and flowing a measurement-object gas, a measurement electrode disposed on the inner peripheral surface of the measurement-object gas flowing portion, a measurement-object gas side electrode disposed in a portion of the laminate that is exposed to the measurement-object gas, a reference electrode disposed in the laminate, and a porous reference gas introduction layer for introducing a reference gas as a reference for detecting a specific gas concentration of the measurement-object gas from an entrance and allowing the reference gas to flow to the reference electrode disposed at the back. The reference gas introduction layer is divided by a partition position defined to be in the range of 50 to 95% of the full length of the reference gas introduction layer from the entrance toward the inside, into a back side portion and an entrance side portion, the reference electrode is accommodated in the back side portion, and the diffusion resistance Rb of the entrance side portion is higher than the diffusion resistance Ra of the back side portion.

In this sensor element, by flowing a control current between the reference electrode and the measured gas side electrode, oxygen can be pumped to around the reference electrode. This makes it possible to compensate for a decrease in the oxygen concentration around the reference electrode, for example, when the measurement-object gas enters the reference gas introduction layer. The sensor element has a porous reference gas introduction layer for introducing a reference gas as a reference for detecting a specific gas concentration of the measurement-object gas and allowing the reference gas to flow to the reference electrode. The reference gas introduction layer is divided by a partition position defined to be in the range of 50 to 95% of the full length of the reference gas introduction layer from the entrance toward the inside, into a back side portion and an entrance side portion, and the diffusion resistance Rb of the entrance side portion is higher than the diffusion resistance Ra of the back side portion. Oxygen pumped to around the reference electrode diffuses throughout the back side portion of the atmosphere introduction layer, but diffuses less easily in the entrance side portion, and therefore does not easily flow out of the atmosphere introduction layer. As a result, the oxygen stays around the reference electrode, therefore the oxygen concentration around the reference electrode can be easily kept constant. Therefore, in this sensor element, it is possible to suppress the deterioration in detection accuracy of the specific gas concentration.

In the sensor element of the present invention, the diffusion resistance ratio Ra/Rb is preferably no less than 0.015 and no more than 0.6. By doing so, it is possible to further suppress the deterioration in detection accuracy of the specific gas concentration.

In the sensor element of the present invention, the diffusion resistance Ra is preferably no less than 1000[/cm] and no more than 5500[/cm] and the diffusion resistance Rb is preferably no less than 5000[/cm] and no more than 50000 [/cm]. This makes it easier to keep the oxygen concentration around the reference electrode more constant.

In the sensor element of the present invention, the reference gas introduction layer may be a layer formed of the same porous material throughout and having a predetermined thickness, and may be formed such that its width increases from the entrance toward the inside. By doing so, since the diffusion resistance can be set by the width of the reference gas introduction layer, the sensor element of the present invention can be designed relatively easily. For example, the width of the reference gas introduction layer may be formed so as to gradually increase inward from the entrance, or it may be formed so as to increase stepwise from the entrance toward the inside. Examples of the latter include a case where both the back side portion and the entrance side portion are rectangular in plan view and the width of the rectangle of the entrance side portion is smaller than the width of the rectangle of the back side portion.

The gas sensor of the present invention includes the sensor element of any one of the above-described aspects. Therefore, this gas sensor can obtain the same effects as those of the above-described sensor element of the present invention, for example, it is possible to suppress the deterioration in detection accuracy of the specific gas concentration.

The gas sensor of the present invention may include a detecting device that detects the specific gas concentration of the measurement-object gas based on an electromotive force generated between the reference electrode and the measurement electrode, and a reference gas regulating device that flows a control current between the reference electrode and the measurement-object gas side electrode and pumps oxygen to around the reference electrode.

In the sensor element of the present invention, the measurement-object gas side electrode may be disposed on the outer surface of the laminate. The sensor element of the present invention may include an outer electrode disposed on the outer surface of the laminate, and the detecting device may pump out or pump in oxygen through the measurement electrode and the outer electrode based on the electromotive force generated between the reference electrode and the measurement electrode and may detect the specific gas concentration of the measurement-object gas based on the current during pumping out or pumping in. In this case, the outer electrode may also serve as the measurement-object gas side electrode.

DETAILED DESCRIPTION OF THE INVENTION

Figure 1:
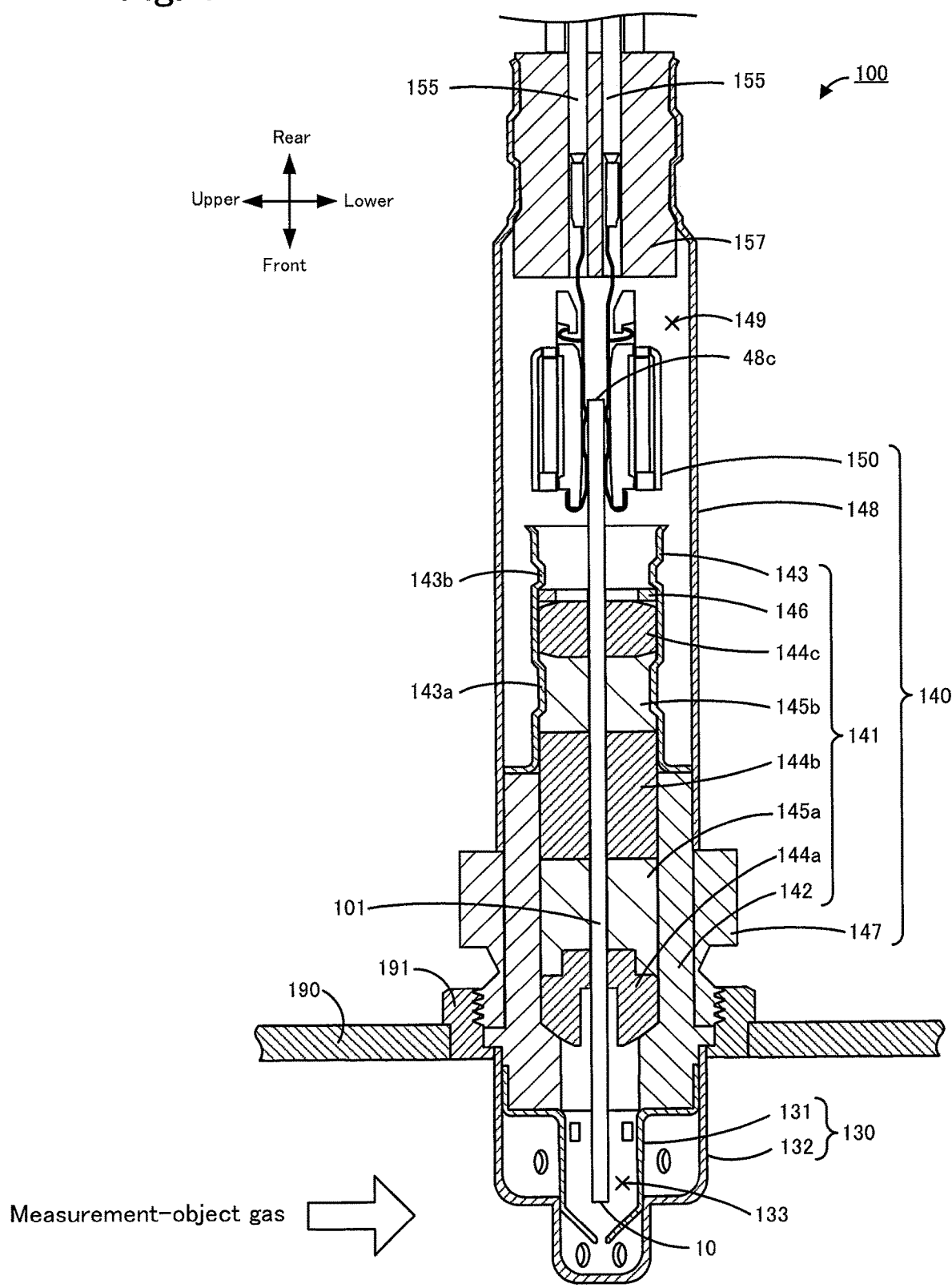
FIG. 1 is a longitudinal sectional view of a gas sensor 100.
Figure 2:
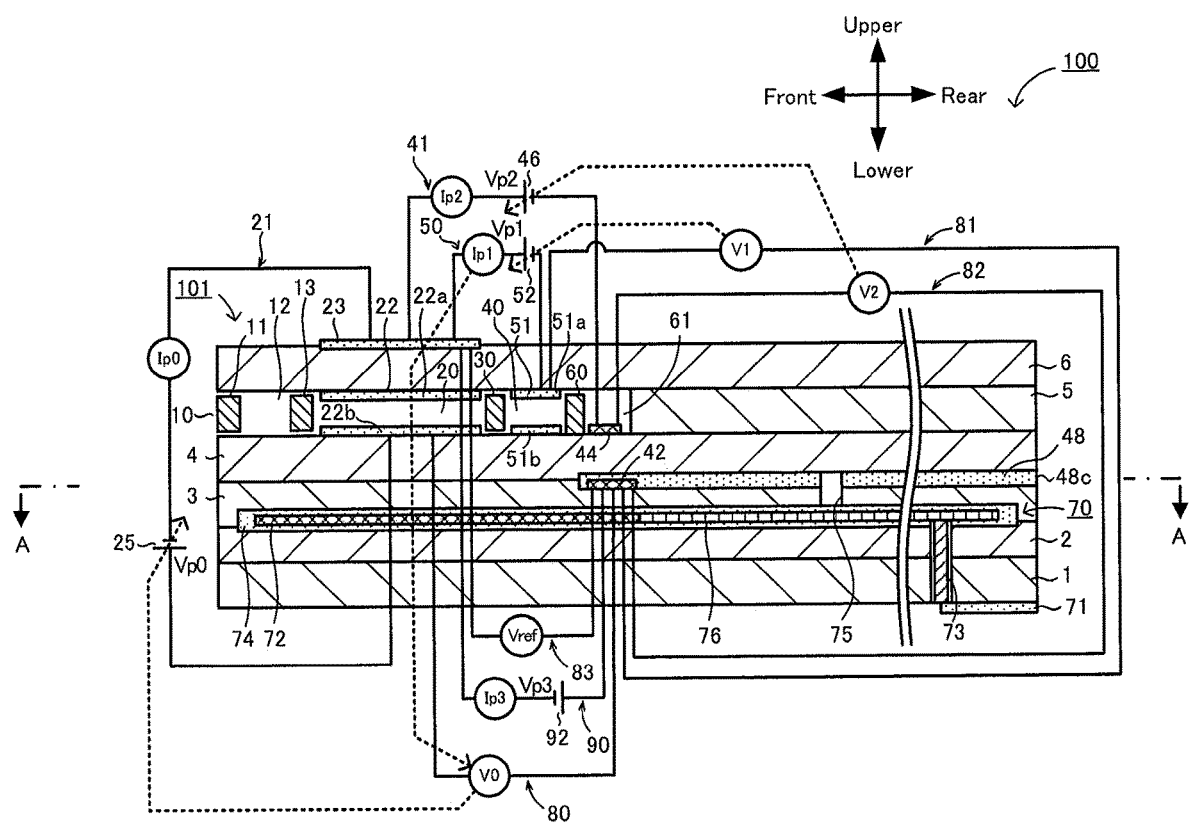
FIG. 2 is a schematic sectional view schematically showing an example of the configuration of a sensor element 101.
Figure 3:
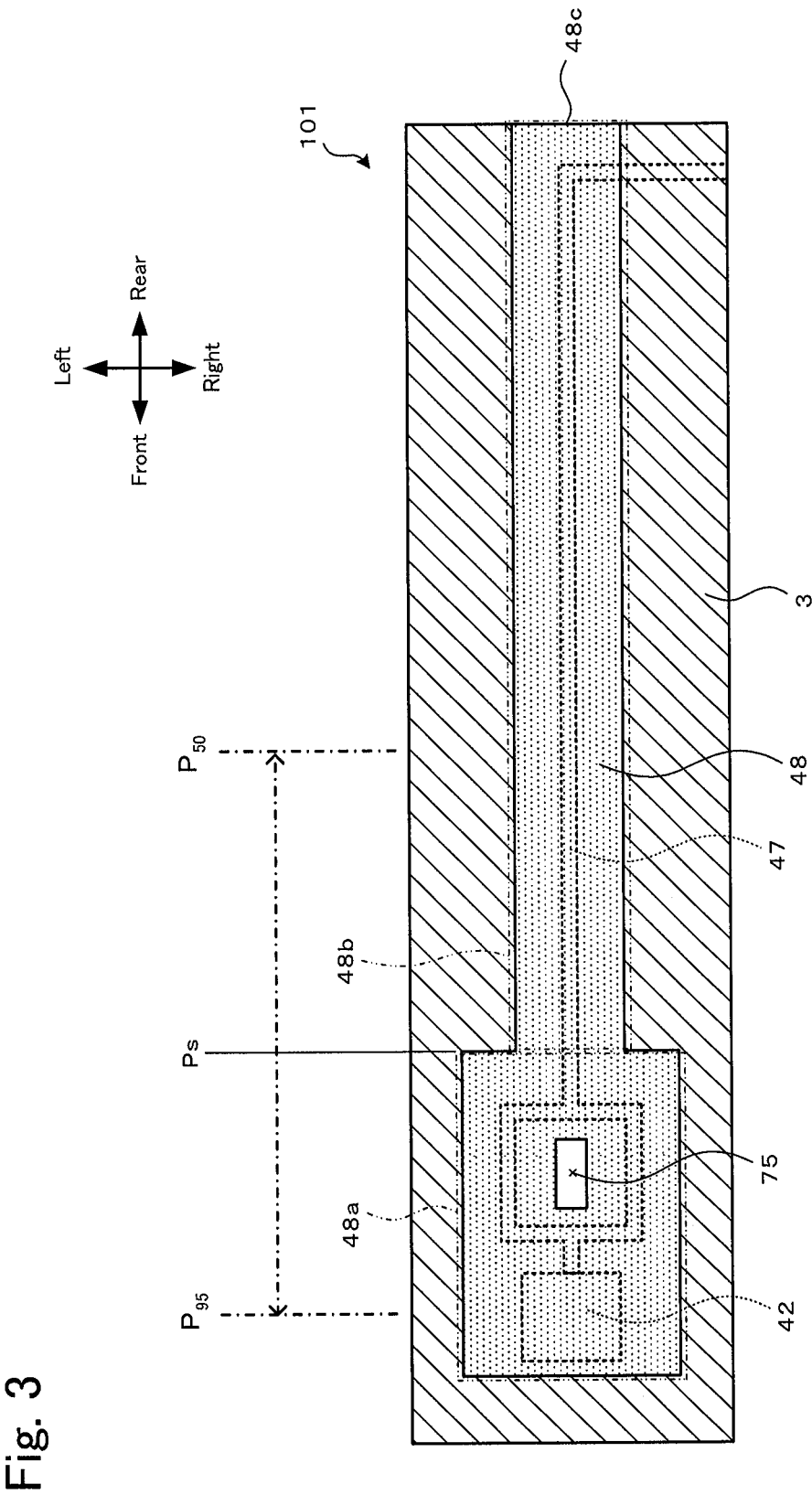
FIG. 3 is a sectional view taken along line A-A of FIG. 2.

Next, an embodiment of the present invention will be described with reference to the drawings. FIG. 1 is a longitudinal sectional view of a gas sensor 100 according to an embodiment of the present invention. FIG. 2 is a schematic sectional view schematically showing an example of a configuration of a sensor element 101 included in the gas sensor 100. FIG. 3 is a sectional view taken along line A-A of FIG. 2. The sensor element 101 has a long rectangular parallelepiped shape, the longitudinal direction (left-right direction in FIG. 2) of the sensor element 101 is referred to as the front-rear direction, and the thickness direction (vertical direction in FIG. 2) of the sensor element 101 is referred to as the vertical direction. The width direction (direction perpendicular to the front-rear direction and the vertical direction) of the sensor element 101 is referred to as the left-right direction. The structure of the gas sensor shown in FIG. 1 is known and is described, for example, in International Publication No. WO 2013/005491.

As shown in FIG. 1, the gas sensor 100 includes a sensor element 101, a protective cover 130 that protects the front end side of the sensor element 101, and a sensor assembly 140 including a connector 150 that has continuity with the sensor element 101. As shown in the figure, the gas sensor 100 is attached to a pipe 190 such as an exhaust gas pipe of a vehicle and is used for measuring the concentration of a specific gas such as NOx or $O_2$ contained in an exhaust gas as a measurement-object gas. In this embodiment, the gas sensor 100 measures the NOx concentration as the specific gas concentration.

The protective cover 130 includes a bottomed tubular inner protective cover 131 covering the front end of the sensor element 101, and a bottomed tubular outer protective cover 132 covering the inner protective cover 131. The inner protective cover 131 and the outer protective cover 132 have a plurality of holes for flowing the measurement-object gas into the protective cover 130. A sensor element chamber 133 is formed as a space surrounded by the inner protective cover 131, and the front end of the sensor element 101 is disposed in the sensor element chamber 133.

The sensor assembly 140 includes an element sealing body 141 that seals and fixes the sensor element 101, a nut 147 attached to the element sealing body 141, an outer tube 148, and a connector 150 in contact with and electrically connected to connector electrodes (not shown) (only a heater connector electrode 71 described later is shown in FIG. 2) formed on surfaces (upper and lower surfaces) at the rear end of the sensor element 101.

The element sealing body 141 includes a tubular main fitting 142, a tubular inner tube 143 coaxially welded and fixed to the main fitting 142, and ceramic supporters 144a to 144c, green compacts 145a and 145b, and a metal ring 146 sealed in through holes inside the main fitting 142 and the inner tube 143. The sensor element 101 is located on the central axis of the element sealing body 141 and passes through the element sealing body 141 in the front-rear direction. The inner cylinder 143 has a reduced diameter portion 143a for pressing the green compact 145b in the direction of the central axis of the inner tube 143, and a reduced diameter portion 143b for pressing forward the ceramic supporters 144a to 144c and the green compacts 145a and 145b via the metal ring 146. By the pressing force from the reduced diameter portions 143a and 143b, the green compacts 145a and 145b are compressed between the main fitting 142 and the inner tube 143 and the sensor element 101. The green compacts 145a and 145b thereby seal the sensor element chamber 133 in the protective cover 130 from a space 149 in the outer tube 148, and fixes the sensor element 101.

The nut 147 is coaxially fixed to the main fitting 142 and has a male threaded portion formed on the outer peripheral surface thereof. The male threaded portion of the nut 147 is inserted into a fixing member 191 that is welded to the pipe 190 and has a female threaded portion in the inner peripheral surface thereof. The gas sensor 100 is thereby fixed to the pipe 190 in a state in which the front end of the sensor element 101 and the portion of the protective cover 130 of the gas sensor 100 protrude into the pipe 190.

The outer tube 148 covers the peripheries of the inner tube 143, the sensor element 101, and the connector 150, and a plurality of lead wires 155 connected to the connector 150 are led out from the rear end to the outside. The lead wires 155 are electrically connected to respective electrodes (described later) of the sensor element 101 via the connector 150. A gap between the outer tube 148 and the lead wires 155 is sealed by a rubber plug 157. The space 149 in the outer cylinder 148 is filled with a reference gas (atmosphere in this embodiment). The rear end of the sensor element 101 is disposed in this space 149.

As shown in FIG. 2, the sensor element 101 is an element having a laminate in which six layers: a first substrate layer 1, an second substrate layer 2, a third substrate layer 3, a first solid electrolyte layer 4, a spacer layer 5, and a second solid electrolyte layer 6 each of which is an oxygen ion conductive solid electrolyte layer such as zirconia ($ZrO_2$) are laminated in this order from the lower side in the drawing. The solid electrolyte forming these six layers is dense and gastight. The sensor element 101 is manufactured, for example, by subjecting ceramic green sheets corresponding to the respective layers to predetermined processing and printing of a circuit pattern, laminating them, and then firing and integrating them.

At one end (left end in FIG. 2) of the sensor element 101 and between the lower surface of the second solid electrolyte layer 6 and the upper surface of the first solid electrolyte layer 4, a gas inlet 10, a first diffusion rate-determining portion 11, a buffer space 12, a second diffusion rate-determining portion 13, a first internal space 20, a third diffusion rate-determining portion 30, a second internal space 40, a fourth diffusion rate-determining portion 60, and a third internal space 61 are adjacently formed so as to communicate in this order.

The gas inlet 10, the buffer space 12, the first internal space 20, the second internal space 40, and the third internal space 61 are spaces in the sensor element 101 that are provided so as to hollow out the spacer layer 5, the upper parts of which are defined by the lower surface of the second solid electrolyte layer 6, the lower parts of which are defined by the upper surface of the first solid electrolyte layer 4, and the side parts of which are defined by the side surface of the spacer layer 5.

The first diffusion rate-determining portion 11, the second diffusion rate-determining portion 13, and the third diffusion rate-determining portion 30 are each provided as two horizontally long slits (whose openings have a longitudinal direction in a direction perpendicular to the drawing). The fourth diffusion rate-determining portion 60 is provided as one horizontally long slit (whose opening has a longitudinal direction in a direction perpendicular to the drawing) formed as clearance from the lower surface of the second solid electrolyte layer 6. A portion from the gas inlet 10 to the third internal space 61 is also referred to as a measurement-object gas flowing portion.

An atmosphere introduction layer 48 is provided between the upper surface of the third substrate layer 3 and the lower surface of the first solid electrolyte layer 4. The atmosphere introduction layer 48 is a porous body made of ceramics such as alumina. The rear end face of the atmosphere introduction layer 48 is an entrance portion 48c, and the entrance portion 48c is exposed on the rear end face of the sensor element 101. The entrance portion 48c is exposed in the space 149 in FIG. 1 (see FIG. 1). A reference gas for measuring the NOx concentration is introduced through the entrance portion 48c into the atmosphere introduction layer 48. In this embodiment, the reference gas is the atmosphere (atmosphere in the space 149 in FIG. 1). The atmosphere introduction layer 48 is formed so as to cover the reference electrode 42. The atmosphere introduction layer 48 introduces the reference gas introduced through the entrance portion 48c into the reference electrode 42 while applying a predetermined diffusion resistance to the reference gas.

The reference electrode 42 is an electrode formed between the upper surface of the third substrate layer 3 and the first solid electrolyte layer 4. As described above, the atmosphere introduction layer 48 is provided around the reference electrode 42. The reference electrode 42 is formed directly on the upper surface of the third substrate layer 3, and the portion other than the portion in contact with the upper surface of the third substrate layer 3 is covered by the atmosphere introduction layer 48. As will be described later, the oxygen concentrations (oxygen partial pressures) in the first internal space 20, the second internal space 40, and the third internal space 61 can be measured using the reference electrode 42. The reference electrode 42 is formed as a porous cermet electrode (for example, a cermet electrode of Pt and $ZrO_2$). Although not particularly limited thereto, the length in the front-rear direction of the reference electrode 42 is, for example, 0.2 to 2 mm, the lateral width is, for example, 0.2 to 2.5 mm, and the thickness is, for example, 5 to 30 µm.

In the measurement-object gas flowing portion, the gas inlet 10 is a part open to the external space, and the measurement-object gas is taken from the external space through the gas inlet 10 into the sensor element 101. The first diffusion rate-determining portion 11 is a portion that applies a predetermined diffusion resistance to the measurement-object gas taken in through the gas inlet 10. The buffer space 12 is a space provided to guide the measurement-object gas introduced from the first diffusion rate-determining portion 11, to the second diffusion rate-determining portion 13. The second diffusion rate-determining portion 13 is a portion that applies a predetermined diffusion resistance to the measurement-object gas introduced from the buffer space 12 into the first internal space 20. When the measurement-object gas is introduced from the outside of the sensor element 101 into the first internal space 20, the measurement-object gas rapidly taken into the sensor element 101 through the gas introduction port 10 by the pressure variation of the measurement-object gas in the external space (pulsation of the exhaust pressure when the measurement-object gas is exhaust gas of an automobile) is introduced into the first internal space 20 not directly but after the concentration variation of the measurement-object gas is canceled through the first diffusion rate determining portion 11, the buffer space 12, and the second diffusion rate determining portion 13. Consequently, the concentration variation of the measurement-object gas introduced into the first internal space 20 is reduced to a substantially negligible level. The first internal space 20 is provided as a space for regulating the oxygen partial pressure in the measurement-object gas introduced through the second diffusion rate-determining portion 13. The oxygen partial pressure is regulated by the operation of the main pump cell 21.

The main pump cell 21 is an electrochemical pump cell including an inner pump electrode 22 having a ceiling electrode portion 22a provided on almost the entire lower surface of the second solid electrolyte layer 6 facing the first internal space 20, an outer pump electrode 23 provided in a region corresponding to the ceiling electrode portion 22a on the upper surface of the second solid electrolyte layer 6 so as to be exposed to the external space (the sensor element chamber 133 in FIG. 1), and the second solid electrolyte layer 6 sandwiched between these electrodes.

The inner pump electrode 22 is formed across the upper and lower solid electrolyte layers (the second solid electrolyte layer 6 and the first solid electrolyte layer 4) defining the first internal space 20 and the spacer layer 5 forming the side wall. Specifically, the ceiling electrode portion 22a is formed on the lower surface of the second solid electrolyte layer 6 that forms the ceiling surface of the first internal space 20, a bottom electrode portion 22b is formed directly on the upper surface of the first solid electrolyte layer 4 that forms the bottom surface, side electrode portions (not shown) are formed on the side wall surfaces (inner surfaces) of the spacer layer 5 that form both side wall portions of the first internal space 20 so as to connect the ceiling electrode portion 22a and the bottom electrode portion 22b, and the inner pump electrode 22 is disposed in a structure having a tunnel shape at a portion where the side electrode portions are disposed.

The inner pump electrode 22 and the outer pump electrode 23 are formed as porous cermet electrodes (for example, cermet electrodes of Pt and $ZrO_2$ containing 1% of Au). The inner pump electrode 22 in contact with the measurement-object gas is formed of a material having a decreased reducing ability for the NOx component in the measurement-object gas.

In the main pump cell 21, oxygen in the first internal space 20 can be pumped out to the external space or oxygen in the external space can be pumped into the first internal space 20 by applying a desired pump voltage Vp0 between the inner pump electrode 22 and the outer pump electrode 23 to flow a pump current Ip0 in the positive direction or the negative direction between the inner pump electrode 22 and the outer pump electrode 23.

In order to detect the oxygen concentration (oxygen partial pressure) in the atmosphere in the first internal space 20, an electrochemical sensor cell, that is, a main pump-controlling oxygen partial pressure detection sensor cell 80 is formed by the inner pump electrode 22, the second solid electrolyte layer 6, the spacer layer 5, the first solid electrolyte layer 4, and the reference electrode 42.

The oxygen concentration (oxygen partial pressure) in the first internal space 20 can be determined by measuring an electromotive force V0 in the main pump-controlling oxygen partial pressure detection sensor cell 80. Further, the pump current Ip0 is controlled by feedback-controlling the pump voltage Vp0 of a variable power supply 25 such that the electromotive force V0 is constant. The oxygen concentration in the first internal space 20 can thereby be kept at a predetermined constant value.

The third diffusion rate-determining portion 30 is a portion that applies a predetermined diffusion resistance to the measurement-object gas whose oxygen concentration (oxygen partial pressure) is controlled by the operation of the main pump cell 21 in the first internal space 20, and guides the measurement-object gas to the second internal space 40.

The second internal space 40 is provided as a space in which, after the oxygen concentration (oxygen partial pressure) is regulated in advance in the first internal space 20, further regulation of the oxygen partial pressure by an auxiliary pump cell 50 is carried out with respect to the measurement-object gas introduced through the third diffusion rate-determining portion 30. The oxygen concentration in the second internal space 40 can thereby be kept constant with high accuracy, and therefore in the gas sensor 100, it is possible to measure the NOx concentration with high accuracy.

The auxiliary pump cell 50 is an auxiliary electrochemical pump cell including an auxiliary pump electrode 51 having a ceiling electrode portion 51a provided on substantially the entire lower surface of the second solid electrolyte layer 6 facing the second internal space 40, the outer pump electrode 23 (not limited to the outer pump electrode 23 but may be an appropriate electrode on the outside of the sensor element 101), and the second solid electrolyte layer 6.

The auxiliary pump electrode 51 is disposed in the second internal space 40, in a structure having a tunnel shape similar to the inner pump electrode 22 provided in the first internal space 20. In other words, the auxiliary pump electrode 51 has such a tunnel-shaped structure that the ceiling electrode portion 51a is formed on the second solid electrolyte layer 6 that forms the ceiling surface of the second internal space 40, a bottom electrode portion 51b is formed directly on the upper surface of the first solid electrolyte layer 4 that forms the bottom surface of the second internal space 40, and side electrode portions (not shown) connecting the ceiling electrode portion 51a and the bottom electrode portion 51b are formed on both wall surfaces of the spacer layer 5 that form side walls of the second internal space 40. As with the inner pump electrode 22, the auxiliary pump electrode 51 is also formed of a material having a decreased reducing ability for the NOx component in the measurement-object gas.

In the auxiliary pump cell 50, oxygen in the atmosphere in the second internal space 40 can be pumped out to the external space or oxygen can be pumped into the second internal space 40 from the external space by applying a desired voltage Vp1 between the auxiliary pump electrode 51 and the outer pump electrode 23.

In order to control the oxygen partial pressure in the atmosphere in the second internal space 40, an electrochemical sensor cell, that is, an auxiliary pump-controlling oxygen partial pressure detection sensor cell 81 is formed by the auxiliary pump electrode 51, the reference electrode 42, the second solid electrolyte layer 6, the spacer layer 5, and the first solid electrolyte layer 4.

The auxiliary pump cell 50 performs pumping at a variable power supply 52 whose voltage is controlled based on an electromotive force V1 detected by the auxiliary pump-controlling oxygen partial pressure detection sensor cell 81. The oxygen partial pressure in the atmosphere in the second internal space 40 is thereby controlled to a low partial pressure that does not substantially affect the measurement of NOx.

At the same time, the pump current Ip1 is used for controlling the electromotive force of the main pump-controlling oxygen partial pressure detection sensor cell 80. Specifically, the pump current Ip1 is input as a control signal into the main pump-controlling oxygen partial pressure detection sensor cell 80, its electromotive force V0 is controlled, and the slope of the oxygen partial pressure in the measurement-object gas introduced into the second internal space 40 from the third diffusion rate-determining portion 30 is thereby controlled to be constant at all times. When the gas sensor 100 is used as an NOx sensor, the oxygen concentration in the second internal space 40 is kept at a constant value of about 0.001 ppm by the operation of the main pump cell 21 and the auxiliary pump cell 50.

The fourth diffusion rate-determining portion 60 is a portion that applies a predetermined diffusion resistance to the measurement-object gas whose oxygen concentration (oxygen partial pressure) is controlled by the operation of the auxiliary pump cell 50 in the second internal space 40, and guides the measurement-object gas to the third internal space 61. The fourth diffusion rate-determining portion 60 serves to limit the amount of NOx flowing into the third internal space 61.

The third internal space 61 is provided as a space in which, after the oxygen concentration (oxygen partial pressure) is regulated in advance in the second internal space 40, a process related to the measurement of the concentration of nitrogen oxides (NOx) in the measurement-object gas is performed on the measurement-object gas introduced through the fourth diffusion rate-determining portion 60. Measurement of the NOx concentration is mainly performed in the third internal space 61 by the operation of the measurement pump cell 41.

The measurement pump cell 41 measures the concentration of NOx in the measurement-object gas in the third internal space 61. The measurement pump cell 41 is an electrochemical pump cell including a measurement electrode 44 provided directly on the upper surface of the first solid electrolyte layer 4 facing the third internal space 61, the outer pump electrode 23, the second solid electrolyte layer 6, the spacer layer 5, and the first solid electrolyte layer 4. The measurement electrode 44 is a porous cermet electrode. The measurement electrode 44 also functions as an NOx reducing catalyst to reduce NOx present in the atmosphere in the third internal space 61.

In the measurement pump cell 41, oxygen generated by the decomposition of nitrogen oxides in the atmosphere around the measurement electrode 44 can be pumped out, and the generated amount can be detected as a pump current $Ip2$.

In order to detect the oxygen partial pressure around the measurement electrode 44, an electrochemical sensor cell, that is, a measurement pump-controlling oxygen partial pressure detection sensor cell 82 is formed by the first solid electrolyte layer 4, the measurement electrode 44, and the reference electrode 42. A variable power supply 46 is controlled based on an electromotive force V2 detected by the measurement pump-controlling oxygen partial pressure detection sensor cell 82.

The measurement-object gas introduced into the second internal space 40 reaches the measurement electrode 44 of the third internal space 61 through the fourth diffusion rate-determining portion 60 under a condition where the oxygen partial pressure is controlled. The nitrogen oxide in the measurement-object gas around the measurement electrode 44 is reduced to generate oxygen ($2NO \rightarrow N_2+O_2$). The generated oxygen is pumped by the measurement pump cell 41. At that time, a voltage Vp2 of the variable power supply 46 is controlled such that the electromotive force V2 detected by the measurement pump-controlling oxygen partial pressure detection sensor cell 82 is constant. Since the amount of oxygen generated around the measurement electrode 44 is proportional to the concentration of nitrogen oxides in the measurement-object gas, the concentration of nitrogen oxides in the measurement-object gas is calculated using the pump current Ip2 in the measurement pump cell 41.

An electrochemical sensor cell 83 is formed by the second solid electrolyte layer 6, the spacer layer 5, the first solid electrolyte layer 4, the third substrate layer 3, the outer pump electrode 23, and the reference electrode 42, and the oxygen partial pressure in the measurement-object gas outside the sensor can be detected by using an electromotive force Vref obtained by the sensor cell 83.

Further, an electrochemical reference gas regulation pump cell 90 is formed by the second solid electrolyte layer 6, the spacer layer 5, the first solid electrolyte layer 4, the third substrate layer 3, the outer pump electrode 23, and the reference electrode 42. The reference gas regulation pump cell 90 performs pumping when a control current Ip3 flows due to a voltage Vp3 applied by a variable power supply 92 connected between the outer pump electrode 23 and the reference electrode 42. The reference gas regulation pump cell 90 thereby pumps oxygen from the space around the outer pump electrode 23 (sensor element chamber 133 in FIG. 1) to around the reference electrode 42. The voltage Vp3 of the variable power supply 92 is predetermined as such a direct current voltage that the control current Ip3 is a predetermined value (direct current of a constant value).

In the gas sensor 100 having such a configuration, by operating the main pump cell 21 and the auxiliary pump cell 50, measurement-object gas whose oxygen partial pressure is always maintained at a constant low value (a value substantially not affecting the NOx measurement) is given to the measurement pump cell 41. Accordingly, the NOx concentration in the measurement-object gas can be determined based on the pump current Ip2 that flows when the oxygen generated by the reduction of NOx is pumped out by the measurement pump cell 41 substantially in proportion to the concentration of NOx in the measurement-object gas.

Further, in order to enhance the oxygen ion conductivity of the solid electrolyte, the sensor element 101 is provided with a heater portion 70 serving as a temperature regulating device for heating the sensor element 101 to keep it warm. The heater portion 70 includes a heater connector electrode 71, a heater 72, a through hole 73, a heater insulating layer 74, a pressure release hole 75, and a lead wire 76.

The heater connector electrode 71 is an electrode formed in contact with the lower surface of the first substrate layer 1. By connecting the heater connector electrode 71 to an external power supply, power can be supplied to the heater portion 70 from the outside.

The heater 72 is an electric resistor formed so as to be sandwiched between the second substrate layer 2 and the third substrate layer 3 from above and below. The heater 72 is connected to the heater connector electrode 71 via the lead wire 76 and the through hole 73, and generates heat by being supplied with power from the outside through the heater connector electrode 71 to heat the solid electrolyte forming the sensor element 101 and keep it warm.

The heater 72 is embedded over the entire area from the first internal space 20 to the third internal space 61 and can regulate the entire sensor element 101 to a temperature at which the solid electrolyte is activated.

The heater insulating layer 74 is an insulating layer of porous alumina formed of an insulator, such as alumina, on the upper and lower surfaces of the heater 72. The heater insulating layer 74 is formed for the purpose of obtaining electrical insulation between the second substrate layer 2 and the heater 72 and electrical insulation between the third substrate layer 3 and the heater 72.

The pressure release hole 75 is a portion provided so as to penetrate through the third substrate layer 3 and the atmosphere introduction layer 48, and is formed for the purpose of relieving an increase in internal pressure accompanied with a temperature rise in the heater insulating layer 74.

Figure 4:
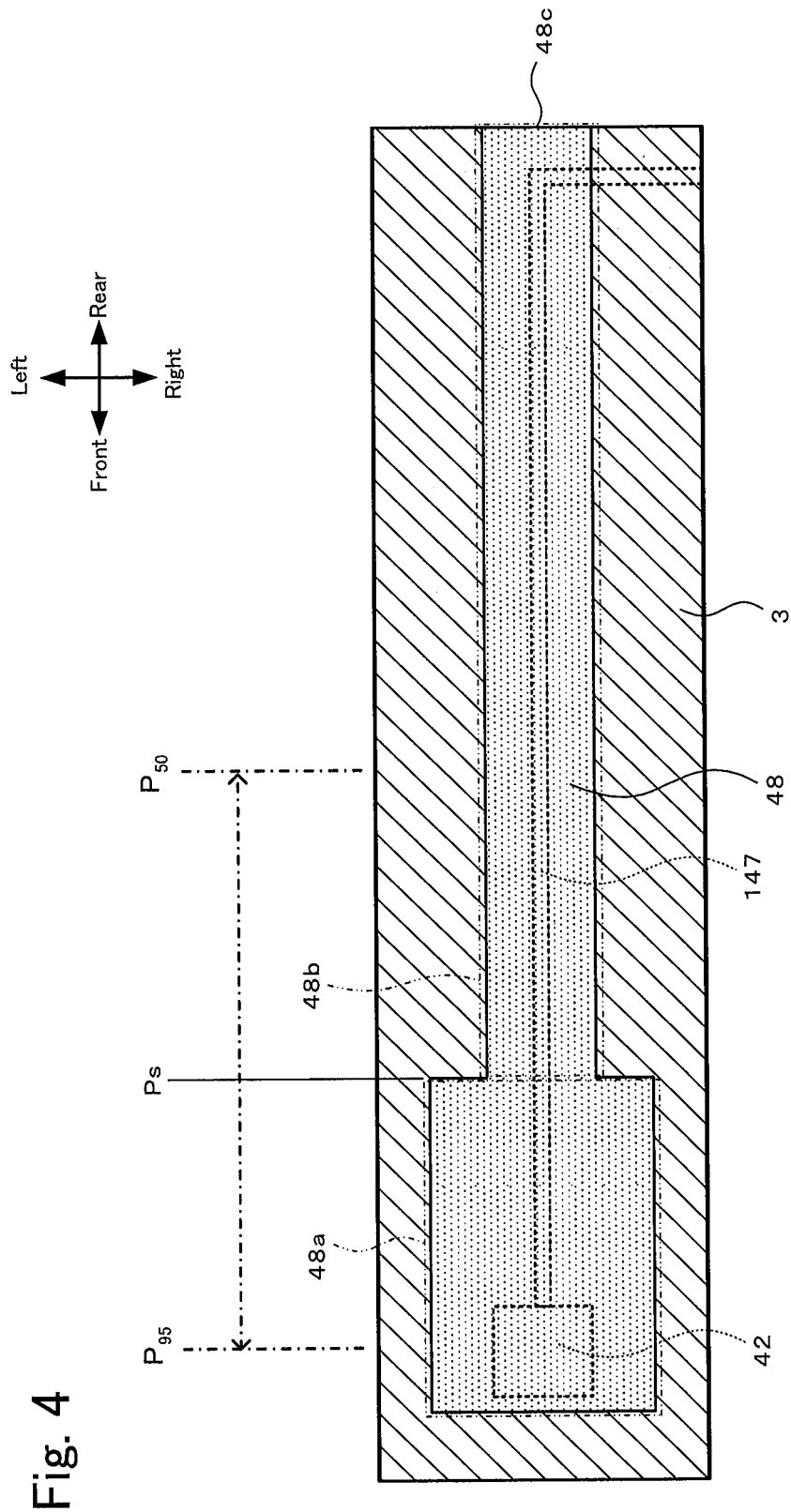
FIG. 4 is a sectional view for explaining a reference electrode lead 147.

The variable power supplies 25, 46, 52, and 92 shown in FIG. 2 are actually connected to the respective electrodes via lead wires (not shown) formed in the sensor element 101 (only the reference electrode leads 47 and 147 described later is shown in FIGS. 3 and 4) and the connector 150 and the lead wire 155 in FIG. 1.

Here, the configuration of the atmosphere introduction layer 48 and its surroundings will be described in detail with reference to FIG. 3. The atmosphere introduction layer 48 extends inward (here, forward) along the longitudinal direction of the sensor element 101 (here, the front-rear direction) from the entrance portion 48c and reaches a position beyond the reference electrode 42. The atmosphere introduction layer 48 is divided by the partition position Ps defined to be in the range of 50 to 95% (preferably 70 to 95%, more preferably 85 to 95%) of the full length (here, the length in the front-rear direction) from the entrance portion 48c toward the inside, into a back side portion 48a and an entrance side portion 48b. In FIG. 3, positions of 50% and 95% of the total length from the entrance portion 48c toward the inside are denoted by $P_{50}$ and $P_{95}$, respectively. The reference electrode 42 is accommodated in the back side portion 48a. Therefore, the partition position Ps is set in consideration of the size of the reference electrode 42. For example, in FIG. 3, when the partition position Ps is made to coincide with $P_{95}$, the reference electrode 42 protrudes from the back side portion 48a. Therefore, the partition position Ps is set within such a range that the reference electrode 42 does not protrude from the back side portion 48a. The atmosphere introduction layer 48 is a layer formed of the same porous material throughout and having a predetermined thickness (in this case, the length in the vertical direction) and is a layer having a rectangular cross section taken along a plane perpendicular to the longitudinal direction of the sensor element 101. The thickness of the atmosphere introduction layer 48 is not particularly limited, but it may be appropriately set within the range of, for example, 10 to 30 μm. The porosity of the porous material forming the atmosphere introduction layer 48 is not particularly limited, but it may be appropriately set within the range of, for example, 10 to 50 vol %. The width (here, the length in the left-right direction) of the atmosphere introduction layer 48 is formed so as to increase stepwise from the entrance portion 48c toward the inside. Specifically, both the back side portion 48a and the entrance side portion 48b are rectangular in plan view, that is, when viewed from above, and the width of the rectangle of the entrance side portion 48b is smaller than the width of the rectangle of the back side portion 48a. As a result, the diffusion resistance Rb of the entrance side portion 48b is higher than the diffusion resistance Ra of the back side portion 48a. The diffusion resistance Ra of the back side portion 48a was calculated by dividing the front-rear direction length (unit: cm) of the back side portion 48a by the cross sectional area of the back side portion 48a (unit: $cm^2$) taken along a plane perpendicular to the front-rear direction. The diffusion resistance Rb of the entrance side portion 48b was also calculated in the same manner.

A reference electrode lead 47 is electrically connected to the reference electrode 42. The reference electrode lead 47 is provided such that it extends to the left from the right side surface of the sensor element 101, enters the inside of the porous atmosphere introduction layer 48, is bent forward along the longitudinal direction of the atmosphere introduction layer 48, and reaches the reference electrode 42. But it is wired so as to bypass the pressure release hole 75 on the way. The reference electrode lead 47 is connected to the connector electrode of the connector 150 (see FIG. 1). Through this connector electrode, the reference electrode 42 can be energized from the outside and the voltage and current of the reference electrode 42 can be measured externally.

Next, an example of a method for manufacturing such a gas sensor 100 will be described below. First, six unfired ceramic green sheets containing an oxygen ion conductive solid electrolytes such as zirconia as a ceramic component are prepared. In these green sheets, a plurality of sheet holes used for positioning during printing and lamination, required through holes, and the like are formed in advance. A space serving as the measurement-object gas flowing portion is provided in advance in the green sheet to be the spacer layer 5 by a punching process or the like. Then, in correspondence with the first substrate layer 1, the second substrate layer 2, the third substrate layer 3, the first solid electrolyte layer 4, the spacer layer 5, and the second solid electrolyte layer 6, a pattern printing process and a drying process for forming various patterns in the ceramic green sheets are performed. Specifically, the patterns to be formed include, for example, the above-described respective electrodes, lead wires connected to the respective electrodes, the atmosphere introduction layer 48, the heater portion 70, and the like. The pattern printing is carried out by applying a pattern-forming paste prepared according to the characteristics required for each object on the green sheet using a known screen printing technique. The drying process is also carried out using a known drying device. After the pattern printing and drying are finished, printing and drying of the bonding paste for stacking and bonding the green sheets corresponding to the respective layers are performed. Then, the green sheets on which the bonding paste is formed are stacked in a predetermined order while being positioned by the sheet holes, and a pressure bonding process is performed by applying predetermined temperature and pressure conditions to perform pressure bonding to form one laminate. The laminate obtained in this way includes a plurality of sensor elements 101. The laminate is cut and cut into the size of the sensor element 101. Then, the cut laminate is fired at a predetermined firing temperature to obtain the sensor element 101.

After the sensor element 101 is obtained in this way, a sensor assembly 140 (see FIG. 1) incorporating the sensor element 101 is manufactured, and the protective cover 130, the rubber plug 157, and the like are attached to obtain the gas sensor 100. Such a manufacturing method of a gas sensor is known and is described in, for example, International Publication No. WO 2013/005491.

Here, the role played by the reference gas regulation pump cell 90 will be described in detail. The measurement-object gas is introduced from the sensor element chamber 133 shown in FIG. 1 to the measurement-object gas flowing portion, such as the gas inlet 10, of the sensor element 101. On the other hand, the reference gas (atmosphere) in the space 149 shown in FIG. 1 is introduced into the atmosphere introduction layer 48 of the sensor element 101. The sensor element chamber 133 and the space 149 are separated by the sensor assembly 140 (in particular, the green compacts 145a and 145b), and are sealed so that gases do not flow therebetween. However, when the pressure on the measurement-object gas side temporarily increases, for example, the measurement-object gas may slightly enter the space 149. If the oxygen concentration around the reference electrode 42 thereby temporarily decreases, the reference potential which is the potential of the reference electrode 42 changes. As a result, the electromotive force based on the reference electrode 42, such as the electromotive force V2 of the measurement pump-controlling oxygen partial pressure detection sensor cell 82, changes, and the detection accuracy of the NOx concentration in the measurement-object gas decreases. The reference gas regulation pump cell 90 serves to suppress such a deterioration in detection accuracy. When the control current Ip3 flows, the reference gas regulation pump cell 90 pumps a certain amount of oxygen from around the outer pump electrode 23 to around the reference electrode 42. Thus, when, as described above, the measurement-object gas temporarily lowers the oxygen concentration around the reference electrode 42, it is possible to compensate for the decreased oxygen and to suppress the deterioration in detection accuracy of the NOx concentration. The value of the control current Ip3 (for example, average value) can be determined in advance by experiments or the like based on how much the oxygen concentration around the reference electrode 42 decreases when the pressure of the measurement-object gas is the assumed maximum value (how much oxygen needs to be pumped to around the reference electrode 42).

In the case where oxygen is pumped to around the reference electrode 42 by the reference gas regulation pump cell 90, conventionally, the oxygen pumped to around the reference electrode 42 immediately flows out to the outside through the entrance of the atmosphere introduction layer 48. In this embodiment, the porous atmosphere introduction layer 48 is divided by the partition position Ps into the back side portion 48a and the entrance side portion 48b, and the diffusion resistance Rb of the entrance side portion 48b is higher than the diffusion resistance Ra of the back side portion 48a. Oxygen pumped to around the reference electrode 42 diffuses throughout the back side portion 48a of the atmosphere introduction layer 48, but diffuses less easily in the entrance side portion 48b, and can therefore be prevented from easily flowing out of the atmosphere introduction layer 48. As a result, the oxygen stays around the reference electrode 42, therefore the oxygen concentration around the reference electrode 42 can be easily kept constant, and the deterioration in detection accuracy of the NOx concentration can be suppressed.

Here, the correspondence relationship between the components of this embodiment and the components of the present invention will be clarified. The first substrate layer 1, the second substrate layer 2, the third substrate layer 3, the first solid electrolyte layer 4, the spacer layer 5, and the second solid electrolyte layer 6 of this embodiment correspond to the laminate of the present invention. The measurement electrode 44 corresponds to the measurement electrode, the outer pump electrode 23 corresponds to the measurement-object gas side electrode, the reference electrode 42 corresponds to the reference electrode, and the atmosphere introduction layer 48 corresponds to the reference gas introduction layer. The measurement pump cell 41 corresponds to the detecting device, and the reference gas regulation pump cell 90 corresponds to the reference gas regulating device.

According to the gas sensor 100 of this embodiment described in detail above, since the diffusion resistance Rb of the entrance side portion 48b is set to be higher than the diffusion resistance Ra of the back side portion 48a of the atmosphere introduction layer 48, the oxygen concentration around the reference electrode 42 can be easily kept constant, and the deterioration in detection accuracy of the NOx concentration can be suppressed.

The atmosphere introduction layer 48 is a layer formed of the same porous material throughout and having a predetermined thickness, and is formed such that its width increases toward the inside from the entrance portion 48c. Specifically, both the back side portion 48a and the entrance side portion 48b are rectangular in plan view, and the width of the rectangle of the entrance side portion 48b is smaller than the width of the rectangle of the back side portion 48a. Accordingly, since the diffusion resistance can be set by the width of the atmosphere introduction layer 48, the sensor element 101 can be designed relatively easily.

The diffusion resistance ratio Ra/Rb between the diffusion resistance Ra of the back side portion 48a and the diffusion resistance Rb of the entrance side portion 48b may be less than 1, but is preferably no less than 0.015 and no more than 0.6. This is because in this range, the deterioration in NOx detection accuracy can be further suppressed. The ratio Ra/Rb is more preferably no less than 0.02 and no more than 0.52. The diffusion resistances Ra and Rb are not particularly limited, but the diffusion resistance Ra is preferably no less than 1000[/cm] and no more than 5500[/cm] and the diffusion resistance Rb is preferably no less than 5000[/cm] and no more than 50000[/cm]. Within this range, the oxygen concentration around the reference electrode 42 can be kept more constant.

It goes without saying that the present invention is not limited to the above-described embodiment at all and can be implemented in various modes without departing from the technical scope of the present invention.

For example, in the above-described embodiment, the reference electrode lead 47 is bifurcated midway in order to bypass the pressure release hole 75, but in the case where there is no pressure release hole 75, it is not necessary to bypass. In that case, the reference electrode lead 147 may have a simple shape shown in FIG. 4. In FIG. 4, the same reference numerals are given to the same components as those in the above-described embodiment.

Figure 5:
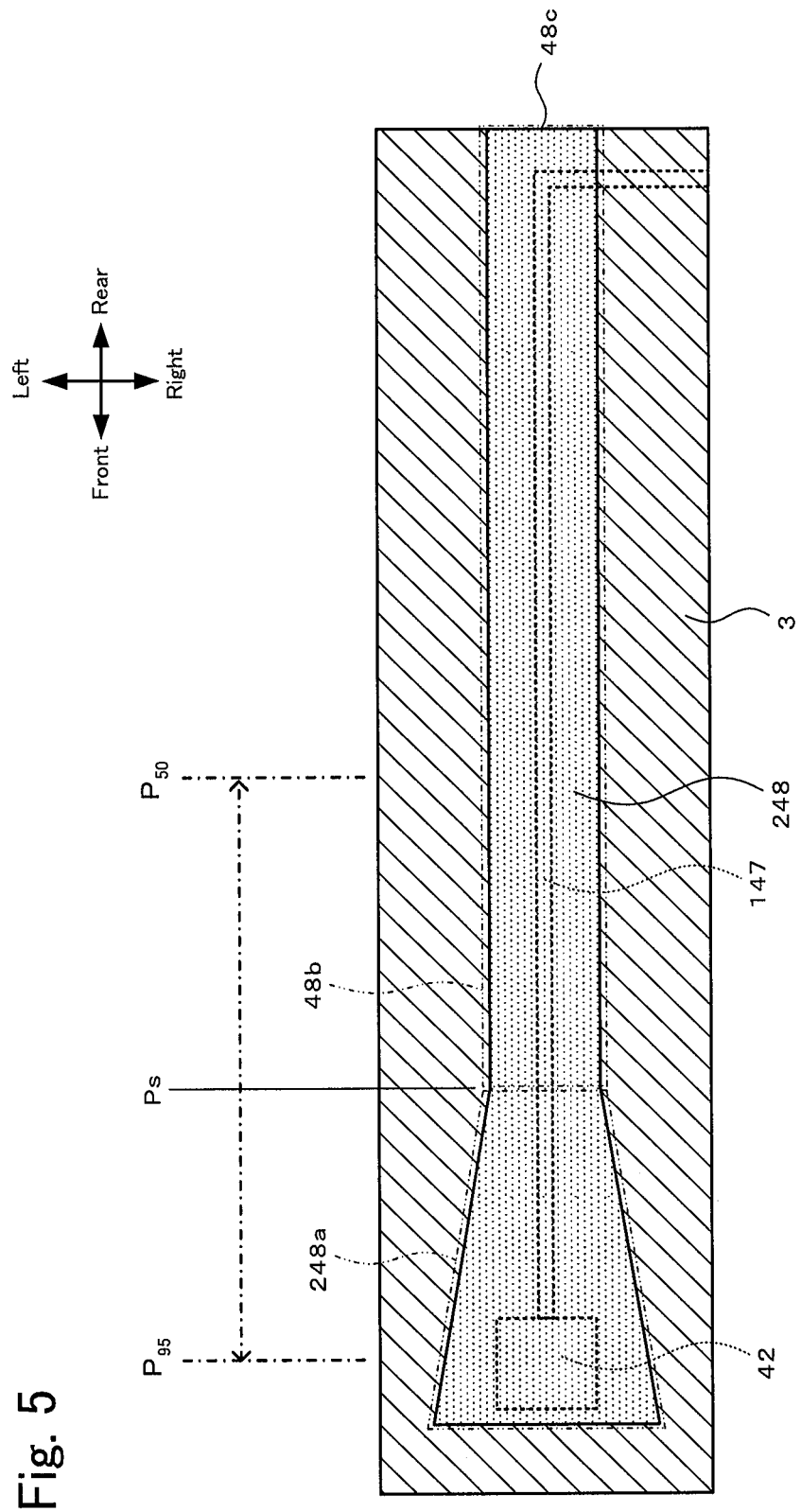
FIG. 5 is a sectional view for explaining an atmosphere introduction layer 248.
Figure 6:
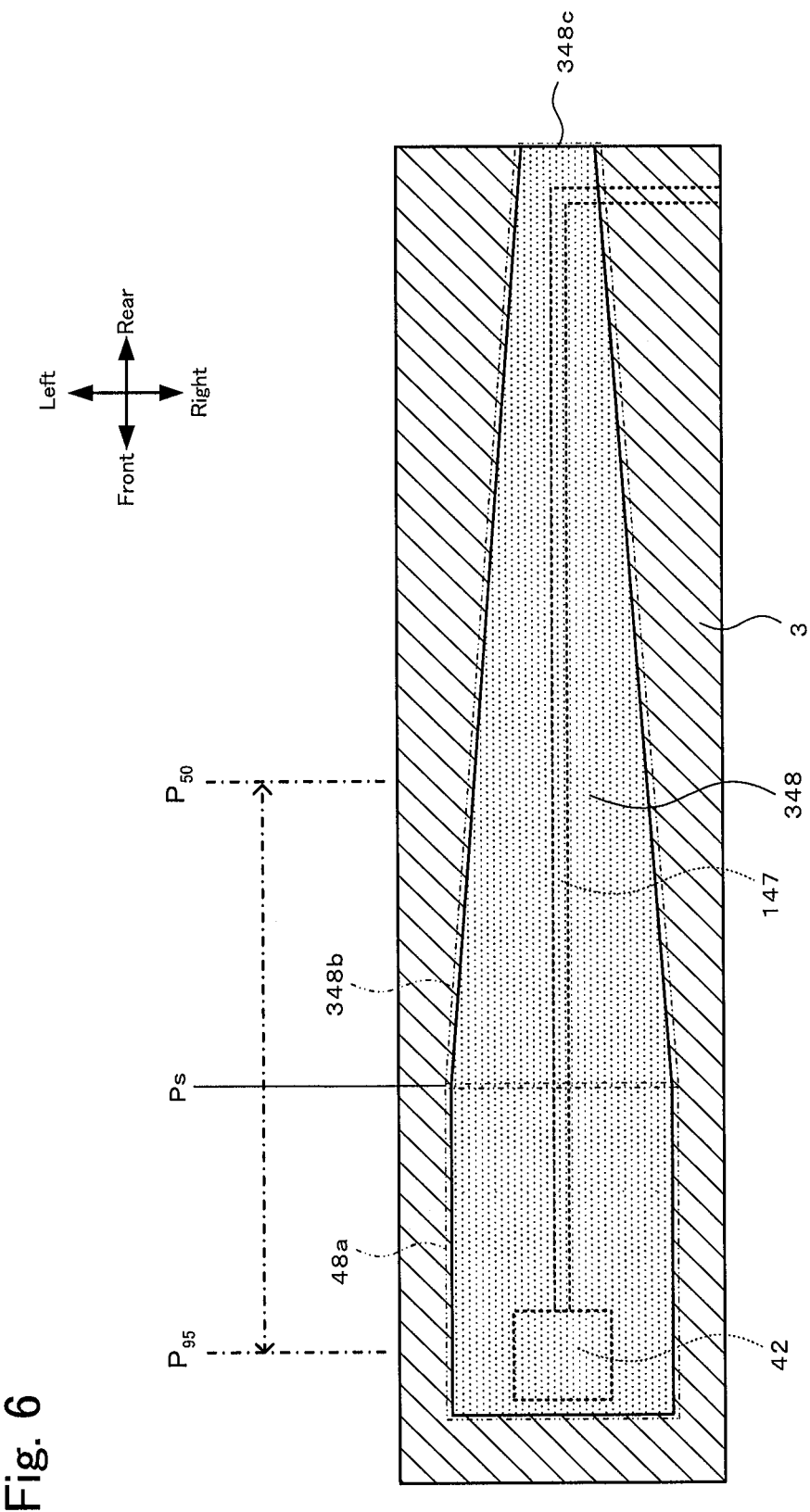
FIG. 6 is a sectional view for explaining an atmosphere introduction layer 348.
Figure 7:
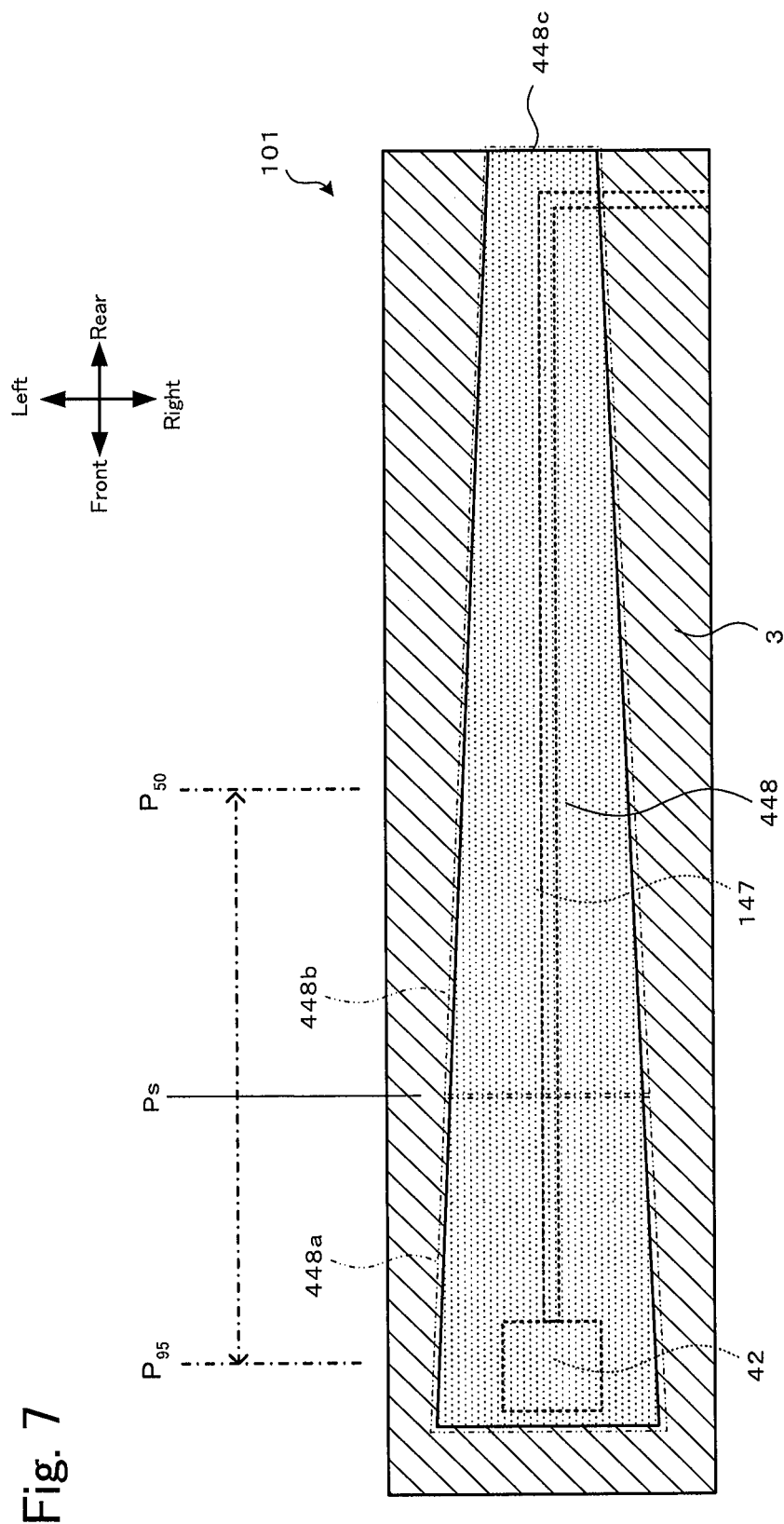
FIG. 7 is a sectional view for explaining an atmosphere introduction layer 448.

In the above-described embodiment, both the back side portion 48a and the entrance side portion 48b are formed to be rectangular in plan view, but the present invention is not limited thereto, and for example, the shapes shown in FIGS. 5 to 7 may be used. In FIGS. 5 to 7, the same reference numerals are given to the same components as those in the above-described embodiment (the reference electrode lead 147 in FIG. 4 is used). In the atmosphere introduction layer 248 in FIG. 5, the width of the back side portion 248a gradually increases from the partition position Ps towards the inside (in this case, toward the front). In the atmosphere introduction layer 348 in FIG. 6, the width of the entrance side portion 348b gradually increases inward from the entrance portion 348c. In FIG. 7, the width of the atmosphere introduction layer 448 gradually increases inward from the entrance portion 448c. Therefore, the width of the back side portion 448a gradually increases inward from the partition position Ps, and the width of the entrance side portion 448b gradually increases inward from the entrance portion 448c. The diffusion resistance of the back side portion 248a in FIG. 5 is determined by dividing the length in the front-rear direction by the average cross-sectional area, the average cross-sectional area being the quotient of the volume of the back side portion 248a divided by the length in the front-rear direction. The same applies to the entrance side portion 348b in FIG. 6 and the back side portion 448a and the entrance side portion 448b in FIG. 7. Whichever of the atmosphere introduction layers 248, 348, and 448 in FIG. 5 to FIG. 7 is used, since the diffusion resistance Rb of the entrance side portion is higher than the diffusion resistance Ra of the back side portion, the same effects as those of the above-described embodiment can be obtained.

In the above-described embodiment, the diffusion resistances Ra and Rb are set by changing the width (the length in the left-right direction) while keeping the thickness (length in the vertical direction) of the back-side portion 48a and the entrance side portion 48b constant, but the diffusion resistances Ra and Rb may be set by changing other parameters. For example, the diffusion resistances Ra and Rb may be set by changing the thickness while keeping the width of the back side portion 48a and the entrance side portion 48b constant. Alternatively, the diffusion resistances Ra and Rb may be set by changing the porosity of the porous material forming the back side portion 48a and the entrance side portion 48b.

Figure 8:
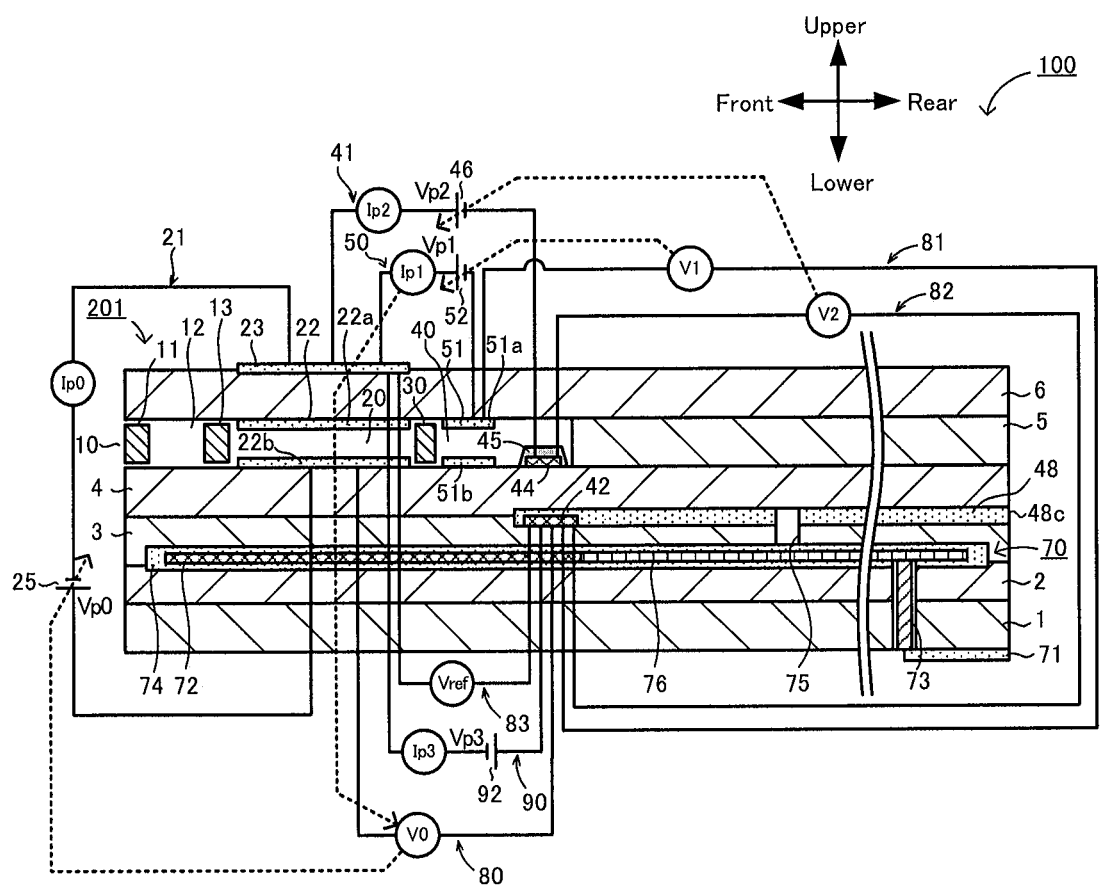
FIG. 8 is a schematic sectional view of a sensor element 201 according to a modified example.

In the above-described embodiment, the sensor element 101 of the gas sensor 100 is provided with the first internal space 20, the second internal space 40, and the third internal space 61, but the present invention is not limited thereto. For example, as in the sensor element 201 in FIG. 8 described above, the third internal space 61 may not be provided. In the sensor element 201 of a modified example shown in FIG. 8, between the lower surface of the second solid electrolyte layer 6 and the upper surface of the first solid electrolyte layer 4, the gas inlet 10, the first diffusion rate-determining portion 11, the buffer space 12, the second diffusion rate-determining portion 13, the first internal space 20, the third diffusion rate-determining portion 30, and the second internal space 40 are adjacent to each other so as to communicate in this order. The measurement electrode 44 is disposed on the upper surface of the first solid electrolyte layer 4 in the second internal space 40. The measurement electrode 44 is covered by a fourth diffusion rate-determining portion 45. The fourth diffusion rate-determining portion 45 is a film formed of a ceramic porous body such as alumina ($Al_2O_3$). As with the fourth diffusion rate-determining portion 60 of the above-described embodiment, the fourth diffusion rate-determining portion 45 serves to limit the amount of NOx flowing into the measurement electrode 44. The fourth diffusion rate-determining portion 45 also functions as a protective film for the measurement electrode 44. The ceiling electrode portion 51a of the auxiliary pump electrode 51 is formed up to just above the measurement electrode 44. Even in the sensor element 201 having such a configuration, the NOx concentration can be detected by the measurement pump cell 41 as in the above-described embodiment.

In the above-described embodiment, the control current Ip3 is a direct current having a constant value, but the present invention is not limited to this. For example, the control current Ip3 may be a pulsed intermittent current. In this embodiment, the control current Ip3 is a direct current having a constant value and is a current always flowing in the direction of pumping oxygen to around the reference electrode 42. However, the control current Ip3 is not limited to this. For example, there may be a period during which the control current Ip3 flows in the direction of pumping out oxygen from around the reference electrode 42. Even in that case, the overall direction of movement of oxygen when viewed in a sufficiently long predetermined period may be the direction in which oxygen is pumped to around the reference electrode 42.

In the above embodiment, the outer pump electrode 23 as the outer electrode of the measurement pump cell 41 also serves as the measurement-object gas side electrode of the reference gas regulation pump cell 90, but the present invention is not limited to this. The outer electrode of the measurement pump cell 41 and the measurement-object gas side electrode of the reference gas regulation pump cell 90 may be separately formed on the outer surface of the sensor element 101. As long as the measurement-object gas side electrode of the reference gas regulation pump cell 90 is disposed in a portion of the sensor element 101 that is exposed to the measurement-object gas, the arrangement position is not limited to the outer surface. For example, the measurement-object gas side electrode may be disposed in the measurement-object gas flowing portion.

In the above-described embodiment, the voltage Vp2 of the variable power supply 46 is controlled such that the control voltage (electromotive force) V2 detected by the measurement pump-controlling oxygen partial pressure detection sensor cell 82 is constant, and the nitrogen oxide concentration in the measurement-object gas is calculated using the pump current Ip2 at this time. However, the present invention is not limited to this as long as the specific concentration in the measurement-object gas is detected based on the voltage between the reference electrode 42 and the measurement electrode 44. For example, if an oxygen partial pressure detecting device is formed as an electrochemical sensor cell by combining the measurement electrode 44, the first solid electrolyte layer 4, the third substrate layer 3, and the reference electrode 42, it is possible to detect the electromotive force corresponding to the difference between the amount of oxygen generated by the reduction of the NOx component in the atmosphere around the measurement electrode 44 and the amount of oxygen contained in the reference gas, and the NOx component in the measurement-object gas can thereby be obtained. In this case, this electrochemical sensor cell corresponds to the detecting device of the present invention.

In the above-described embodiment, the reference electrode 42 is formed directly on the upper surface of the third substrate layer 3, but the present invention is not limited to this. For example, the reference electrode 42 may be formed directly on the lower surface of the first solid electrolyte layer 4.

In the above-described embodiment, the reference gas is atmosphere, but it is not limited to this as long as it is a gas as a reference for detecting the concentration of the specific gas in the measurement-object gas. For example, a gas regulated to a predetermined oxygen concentration (>oxygen concentration of the measurement-object gas) in advance may be filled in the space 149 as a reference gas.

In the above-described embodiment, the sensor element 101 detects the NOx concentration in the measurement-object gas, but it is not limited to this as long as it detects the concentration of a specific gas in the measurement-object gas. For example, the concentration of oxygen in the measurement-object gas may be detected.

EXAMPLES

Hereinafter, examples in which gas sensors are specifically manufactured will be described as examples. The present invention is not limited to the following examples.

Example 1

The gas sensor 100 shown in FIGS. 1 to 3 was manufactured by the above-described manufacturing method and was referred to as Example 1. In manufacturing the sensor element 101, the green sheets were formed by tape casting of a mixture of zirconia particles containing 4 mol % yttria as a stabilizing agent with an organic binder and an organic solvent. As the green compacts 145a and 145b in FIG. 1, talc powder was compacted. The total length of the atmosphere introduction layer 48 was 60.97 mm. A position 88% of the total length from the entrance portion 48c toward the inside was defined as the partition position Ps, the width of the back side portion 48a was 2.26 mm, and the width of the entrance side portion 48b was 0.50 mm. The reference electrode 42 was accommodated in the back side portion 48a. The diffusion resistance Ra of the back side portion 48a was 2800[/cm], the diffusion resistance Rb of the entrance side portion 48b was 38000[/cm], and the diffusion resistance ratio Ra/Rb was 0.074.

Examples 2 to 9, Comparative Examples 1 to 6

Gas sensors 100 were manufactured in the same manner as in Example 1 except that the back side portion 48a and the entrance side portion 48b of the atmosphere introduction layer 48 were made such that the diffusion resistances Ra and Rb were the values shown in Table 1, and were referred to as Examples 2 to 9 and Comparative Examples 1 to 6.

[Evaluation of Detection Accuracy]

The gas sensor of Example 1 was attached to a pipe. Then, the heater 72 was energized to set the temperature to 800° C., and the sensor element 101 was heated. Variable power supplies 25, 46, 52, and 92 were connected to the gas sensor of Example 1. In the variable power supply 92, the voltage Vp3 was regulated such that the control current Ip3 was a direct current of 20 µA. In this state, a model gas having nitrogen as the base gas, an oxygen concentration of 10%, and an NOx concentration of 500 ppm was prepared and was flowed through the pipe as a measurement-object gas. This state was maintained for 20 minutes, and the voltage Vref during that period was measured. Measurements were also made in the same manner for Examples 2 to 9 and Comparative Examples 1 to 6. As the oxygen concentration around the reference electrode 42 becomes lower than the oxygen concentration of the reference gas, the voltage Vref tends to decrease with the lapse of time from the value at the start of measurement. As the voltage Vref decreases, the pump current Ip2 tends to become larger than a correct value (a value corresponding to an NOx concentration of 500 ppm). Therefore, when the value of the voltage Vref at the start of the measurement was 100% and the measured voltage Vref was within the predetermined range (80% or more) even after 20 minutes elapsed, it was determined that the detection accuracy of the NOx concentration was very high ("A"). When the measured voltage Vref fell below the predetermined range from the lapse of 15 minutes to the lapse of 20 minutes, it was determined that the detection accuracy of the NOx concentration was high ("B"). When the measured voltage Vref decreased below the predetermined range before 15 minutes elapsed, it was determined that the detection accuracy of the NOx concentration was low ("C").

The results of the above evaluation tests are shown in Table 1. As shown in Table 1, in the case where the diffusion resistance Rb of the entrance side portion 48b is equal to or lower than the diffusion resistance Ra of the back side portion 48a (Comparative Examples 1 to 6), the evaluation is "C," and the detection accuracy of NOx concentration was low. On the other hand, in the case where the diffusion resistance Rb is higher than the diffusion resistance Ra (Examples 1 to 9), the evaluation is "A" or "B" and the decrease in the detection accuracy of the NOx concentration was suppressed. In particular, in the case where the diffusion resistance ratio Ra/Rb is no less than 0.015 and no more than 0.6 (Examples 1 to 5, 7, and 9), the evaluation is "A", and the decrease in the detection accuracy of the NOx concentration was remarkably suppressed. From Examples 1 to 9, it can be said that the diffusion resistance Ra is preferably no less than 1000[/cm] and no more than 5500[/cm] and the diffusion resistance Rb is preferably no less than 5000[/cm] and no more than 50000[/cm].

TABLE 1

| | Diffusion Resitance Ra [/cm] | Diffusion Resitance Rb [/cm] | Diffusion Resistance Ratio Ra/Rb | Evaluation of Detection Accuracy |
|---|---|---|---|---|
| Example 1 | 2800 | 38000 | 0.074 | A |
| Example 2 | 2500 | 5500 | 0.455 | A |
| Example 3 | 2800 | 5400 | 0.519 | A |
| Example 4 | 5500 | 50000 | 0.110 | A |
| Example 5 | 2200 | 36000 | 0.061 | A |
| Example 6 | 8000 | 12500 | 0.640 | B |
| Example 7 | 1000 | 50000 | 0.020 | A |
| Example 8 | 1000 | 100000 | 0.010 | B |
| Example 9 | 3000 | 31000 | 0.097 | A |
| Comparative Example 1 | 10000 | 10000 | 1.000 | C |
| Comparative Example 2 | 2800 | 2000 | 1.400 | C |
| Comparative Example 3 | 7600 | 4700 | 1.617 | C |
| Comparative Example 4 | 2000 | 1000 | 2.000 | C |
| Comparative Example 5 | 5800 | 4800 | 1.208 | C |
| Comparative Example 6 | 3500 | 2500 | 1.400 | C |

The present application claims priority from Japanese Patent Application No. 2017-067779, filed on Mar. 30, 2017, the entire contents of which are incorporated herein by reference.

What is claimed is:

1. A sensor element comprising:
   a laminate having a plurality of laminated oxygen ion conductive solid electrolyte layers and having therein a measurement-object gas flowing portion for introducing and flowing a measurement-object gas;
   a measurement electrode disposed on an inner peripheral surface of the measurement-object gas flowing portion;
   a measurement-object gas side electrode disposed in a portion of the laminate that is exposed to the measurement-object gas;
   a reference electrode disposed in the laminate; and
   a porous reference gas introduction layer having an entrance portion and a back portion and being formed of the same porous material throughout for introducing a reference gas as a reference for detecting a specific gas concentration of the measurement-object gas, the porous reference gas introduction layer extending from an entrance of the entrance portion toward a back end at the back portion and allowing the reference gas to flow to the reference electrode disposed at the back portion,
   wherein the entrance portion and the back portion of the porous reference gas introduction layer are divided by a partition position defined to be in a range of 50 to 95% of a full length of the porous reference gas introduction layer from the entrance toward the back end at the back portion, the reference electrode is accommodated in the back portion, and the diffusion resistance Rb of the entrance portion is higher than the diffusion resistance Ra of the back portion so that the diffusion resistance of the porous reference gas introduction layer around the reference electrode is less than the diffusion resistance of the porous reference gas introduction layer at the entrance portion to limit outflow of the reference gas from around the reference electrode,
   wherein the diffusion resistance Ra is not less than 1000 [/cm] and not more than 5500 [/cm] and the diffusion resistance Rb is not less than 5400 [/cm] and not more than 50000 [/cm], and wherein the diffusion resistance ratio Ra/Rb is not less than 0.020 and not more than 0.519.

2. The sensor element according to claim 1, wherein the porous reference gas introduction layer is a layer formed of the porous material having a predetermined thickness, and is formed such that its width increases from the entrance toward the back portion.

3. The sensor element according to claim 2, wherein both of the back portion and the entrance portion are rectangular in a plan view and a width of a rectangle of the back portion is larger than a width of a rectangle of the entrance portion.

4. A gas sensor comprising the sensor element according to claim 1.

5. The gas sensor according to claim 4, comprising
a measurement pump cell that includes the measurement electrode and the measurement-object gas side electrode and a variable power supply generating a first control voltage to maintain a voltage between the measurement electrode and the reference electrode at a constant value;
a reference gas regulation pump cell including a power supply that applies a second control voltage between the reference electrode and the measurement-object gas side electrode to pump in oxygen to around the reference electrode;
the measurement pump cell being configured to detect a value of a pump current,
wherein the specific gas concentration in the measurement-object gas is calculated based on the value of the pump current.

* * * * *